(12) United States Patent
Mititelu

(10) Patent No.: US 7,734,736 B2
(45) Date of Patent: Jun. 8, 2010

(54) CONFIGURING VIRTUAL LANS ON LAYER 2

(75) Inventor: Cristian Mititelu, Ottawa (CA)

(73) Assignee: Alcatel Lucent, Paris (FR)

(*) Notice: Subject to any disclaimer, the term of this patent is extended or adjusted under 35 U.S.C. 154(b) by 1478 days.

(21) Appl. No.: 10/642,626

(22) Filed: Aug. 19, 2003

(65) Prior Publication Data
US 2006/0187853 A1 Aug. 24, 2006

(51) Int. Cl.
*G06F 15/177* (2006.01)
(52) U.S. Cl. .................. 709/220; 709/223
(58) Field of Classification Search ........ 709/220–221, 709/223; 370/254–255
See application file for complete search history.

(56) References Cited

U.S. PATENT DOCUMENTS

| | | | |
|---|---|---|---|
| 5,751,967 A | | 5/1998 | Raab |
| 5,878,232 A * | | 3/1999 | Marimuthu ............. 709/249 |
| 6,061,334 A * | | 5/2000 | Berlovitch et al. ........ 370/255 |
| 6,188,694 B1 * | | 2/2001 | Fine et al. ............... 370/402 |
| 6,223,218 B1 * | | 4/2001 | Iijima et al. ............. 709/221 |
| 6,873,602 B1 * | | 3/2005 | Ambe ..................... 370/254 |
| 7,242,499 B2 * | | 7/2007 | Kanda et al. ............ 358/1.16 |
| 2002/0158900 A1 * | | 10/2002 | Hsieh et al. ............. 345/738 |
| 2003/0005115 A1 * | | 1/2003 | Walker et al. ........... 709/225 |
| 2003/0101239 A1 | | 5/2003 | Ishizaki |
| 2004/0037295 A1 * | | 2/2004 | Tanaka et al. .......... 370/395.53 |
| 2004/0042454 A1 * | | 3/2004 | Zabihi et al. ............ 370/392 |
| 2004/0233234 A1 * | | 11/2004 | Chaudhry et al. ....... 345/735 |
| 2005/0240664 A1 * | | 10/2005 | Chen et al. ............. 709/220 |

OTHER PUBLICATIONS

"IEEE STD 802.1Q-2003", Virtual Bridged Local Area Networks, May 2003 XP002320212.

* cited by examiner

*Primary Examiner*—Faruk Hamza
*Assistant Examiner*—Saleh Najjar
(74) *Attorney, Agent, or Firm*—Kramer & Amado, P.C.

(57) ABSTRACT

A method and apparatus are provided for configuring a VLAN on a node of a communication network. A graphical user interface (GUI) is provided at a network management system, through which an operator selects a node and a physical port on the node. The operator identifies which virtual ports associated with the physical port are to be included in each of the member set, the forbidden set, and the untagged set of the VLAN, up the GUI. The GUI is designed so that each virtual port can only belong to one of the member set and the forbidden set. In addition, the network management system ensures that a VLAN ID entered by the operator is unique, and that the maximum number of VLANs have not already been configured on the physical port. The configuration information is thereby validated, and sent to the node for configuration thereon.

18 Claims, 4 Drawing Sheets

CONFIGURING VIRTUAL LANS ON LAYER 2

FIELD OF THE INVENTION

The invention relates to bridging of virtual local area networks, and more particularly to assigning virtual ports on a node to virtual local area networks.

BACKGROUND OF THE INVENTION

Bridges between separate local area networks (LAN) allow customer premises equipment (CPE) within each LAN to communicate with each other. In accordance with the 802.1q VLAN standard, a Virtual LAN (VLAN) can be set up to allow CPEs in different LANs to communicate as if they were within the same LAN, using transparent bridging. The transparent bridging may be provided by Asynchronous Transfer Mode (ATM) nodes within an ATM network. Each ATM node includes one or more Ethernet cards, each of which is physically connected to an Ethernet switch through a physical port on the Ethernet card or to an Ethernet card on a different ATM node. Each 802.1q Ethernet port allows VLAN configuration. Each VLAN is composed of a plurality of virtual ports, for example one dedicated virtual bridge port and 64 virtual ATM ports.

The ATM node stores a member set, a forbidden set, and an untagged set for each of a number of VLANs, each set containing zero or more virtual ports. The member set and forbidden set of each VLAN are exclusive of each other, in that each virtual port can belong to either the member set or the forbidden set of a given VLAN, but not both. A virtual port can however be associated with more than one VLAN, the set to which it belongs being generally independent for each VLAN. For example, a given virtual port may belong to the member set of a first VLAN, and to a forbidden set of a second VLAN.

When an ATM node receives a VLAN tagged frame from a CPE via an Ethernet switch, the ATM node notes that the frame is VLAN tagged and reads the VLAN identification (ID) of the frame. The ATM determines the virtual ports within the member set associated with the VLAN ID of the received frame, and sends a copy of the frame to each virtual port within the member set. The virtual ports effectively lead to a second LAN within the VLAN, via at least one other ATM node, and arrive at an Ethernet switch within the second LAN. The Ethernet switch then forwards the frame to destination CPEs.

VLANs must be configured at the ATM nodes, in order to identify the member set, forbidden set, and untagged set of each VLAN. VLANs are typically configured manually. An operator telnets into a node and opens a Node Terminal Management Interface session. Using command line interface commands, the operator selects a physical port by entering the shelf, slot, and port number. The operator enters a VLAN ID. The operator selects one of member set, untagged set, or forbidden set and enters the virtual ports to be associated with that set for the VLAN ID. The operator may repeat this for the other two sets. The operator repeats this for each physical port, and for each node in the network.

This manual configuration is a time consuming and tedious process. Furthermore, no error checking is done. As a result, invalid VLAN IDs may be inadvertently used, a VLAN may be inadvertently assigned on a physical port which can not support any additional VLANs, and invalid virtual ports may be inadvertently associated with the VLAN. A configuration method or system which removes the tedium of manual configuration and which performs error checking would allow more efficient and reliable configuration of VLANs on ATM nodes.

SUMMARY OF THE INVENTION

In accordance with one aspect of the invention, a method is provided or providing configuration information for a bridged virtual local area network (VLAN) within a communication network, comprising the steps of: presenting a graphical user interface (GUI); receiving an identification of a node and of a physical port through the GUI; receiving a validated VLAN configuration through the GUI; and transmitting the validated VLAN configuration to the node. The step of receiving a validated VLAN configuration may comprise the steps of: receiving an identification of zero or more virtual ports belonging to a forbidden set of the VLAN; receiving an identification of zero or more virtual ports belonging to an untagged set of the VLAN; and ensuring that the member set and the forbidden set have no virtual ports in common.

In accordance with another aspect of the invention, processors are provided for carrying out the methods described above.

The method and apparatus of the present invention allow an operator to provide validated VLAN configuration information to a node, such as an ATM switch, within a communication system. The GUI allows the operator to select a node and physical port and to assign virtual ports to the member set of the VLAN without having to enter command line interface commands, thereby saving time. Assignment of virtual ports to the member set is carried out in a way that ensures validity and uniqueness of set assignment, thereby improving reliability of the configuration information.

BRIEF DESCRIPTION OF THE DRAWINGS

The features and advantages of the invention will become more apparent from the following detailed description of the preferred embodiment(s) with reference to the attached figures, wherein.

It will be noted that in the attached figures, like features bear similar labels.

DETAILED DESCRIPTION OF THE EMBODIMENTS

Figure 1:
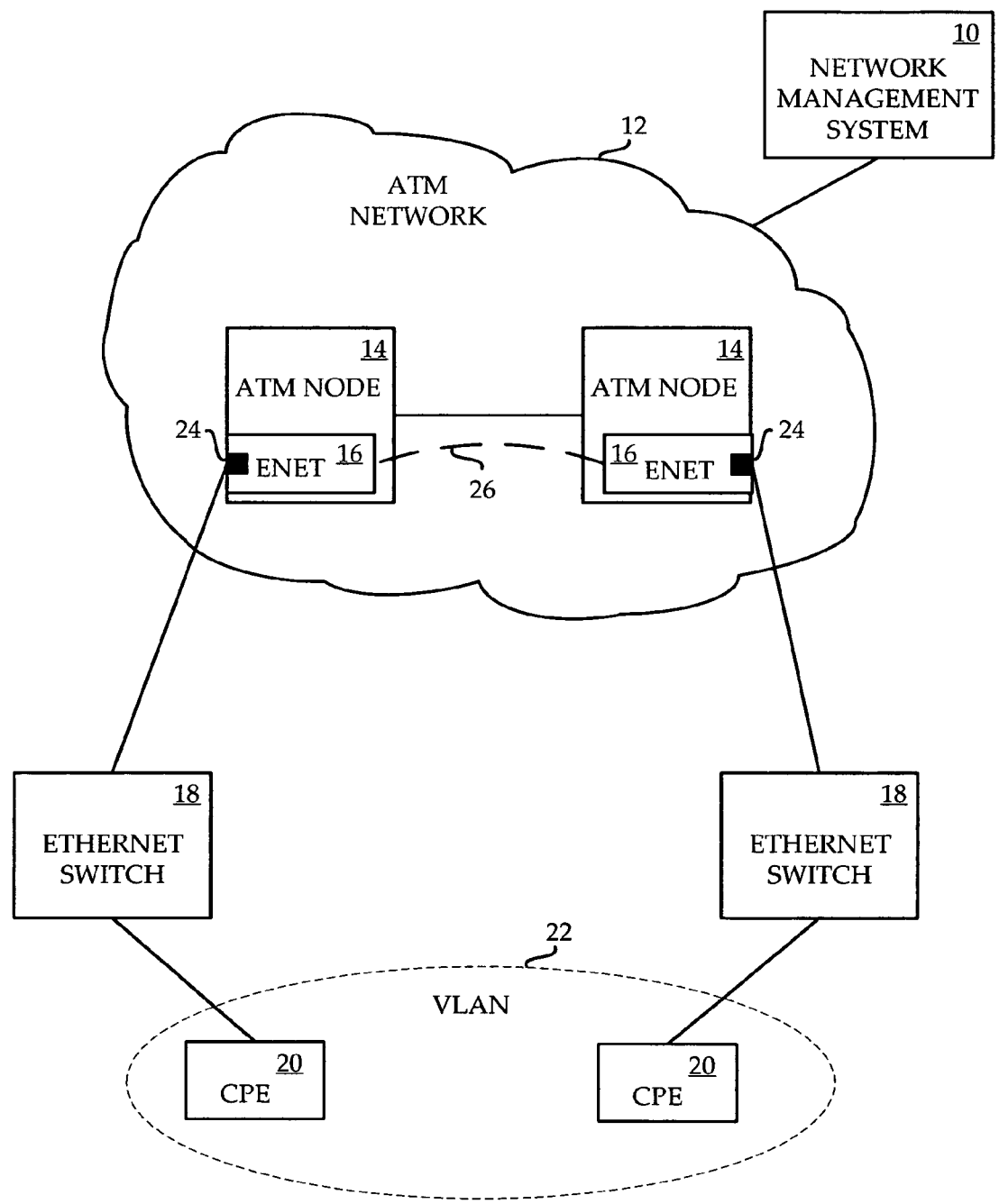
FIG. 1 is a block diagram of a portion of a communication network.

Referring to FIG. 1, a block diagram of a portion of a communication network is shown. A network management system (NMS) 10 is coupled to an Asynchronous Transfer Mode (ATM) network 12. The ATM network 12 includes a plurality of ATM nodes 14, only two of which are shown in FIG. 1. Each ATM node 14 includes at least one Ethernet card 16. Each Ethernet card 16 is coupled to a corresponding Ethernet switch 18. Each Ethernet switch 18 is coupled to a corresponding plurality of customer premises equipment (CPE) sets 20, only one of which is shown in FIG. 1 for each Ethernet switch 18.

To set up a Virtual Local Area Network (VLAN) 22 to include the CPEs 20 connected to the two separate Ethernet switches 18, each Ethernet card provides a Virtual Channel Connection (VCC) termination 24. The Ethernet switches 18 are physically connected to the Ethernet cards 16, and a VCC 26 is established between the two VCC terminations 24 in order to bridge the two Ethernet switches 18.

Figure 2:
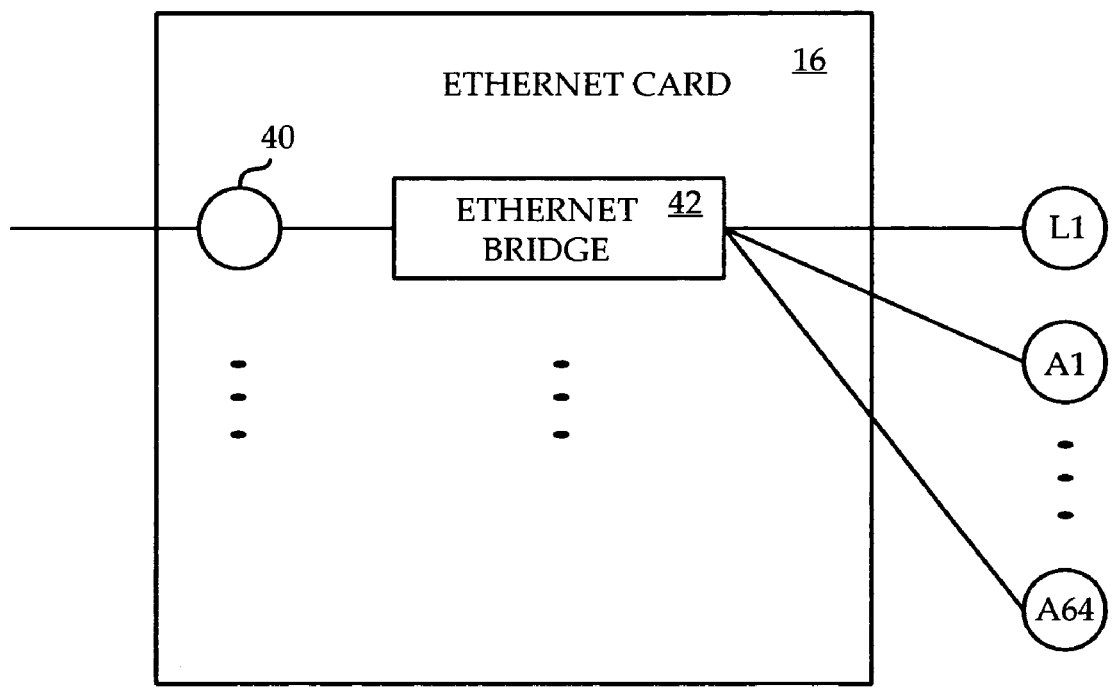
FIG. 2 is a block diagram of a portion of an Ethernet card located on an ATM node of FIG. 1.

Referring to FIG. 2, a block diagram of a portion of an Ethernet card 16 located on an ATM node is shown. The Ethernet card 16 includes at least one physical port 40, only one of which is shown in FIG. 2. The physical port 40 is physically connected to an Ethernet switch 18. Each physical port 40 is also coupled to a respective Ethernet bridge 42. Each Ethernet bridge 42 is associated with 65 bridge ports, or virtual ports, one of which is a LAN bridge port L1 and 64 of which are virtual ATM ports A1 . . . A64. The virtual ports provide the VCC terminations 24 of FIG. 1. ATM connections terminating on the Ethernet bridge 42 are specified using a Virtual Path Identifier having a value equal to a Virtual Connection Number, which is "1", "2", "3", or "4", and using a Virtual Channel Identifier equal to An, where n=1 . . . 64.

The NMS 10 includes instructions for configuring a VLAN on ATM nodes within the ATM network. In the preferred embodiment, the instructions are in the form of software within memory of a personal computer, but may more generally be in the form of any combination of software or hardware within a processor, including hardware within an integrated circuit. The processor need not be a single device, but rather the instructions could be located in more than one device, including a distributed system.

Figure 3:
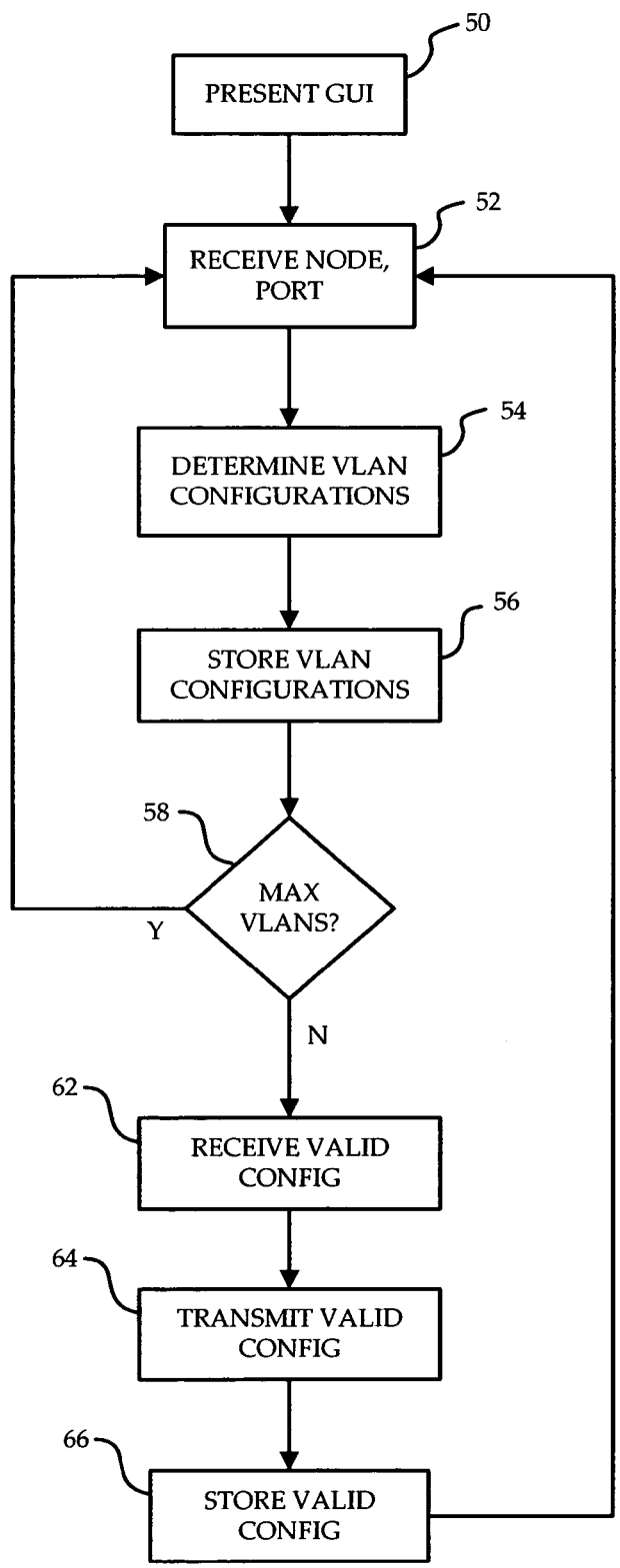
FIG. 3 is a flowchart of a method by which the network management system of FIG. 1 provides VLAN configuration information to an ATM node according to one embodiment of the invention.

Referring to FIG. 3, a flowchart of a method by which the NMS 10 of FIG. 1 provides VLAN configuration information to an ATM node 14 according to one embodiment of the invention is shown. At step 50 the NMS presents a graphical user interface (GUI) to an operator. The GUI allows the operator to select an ATM node and a physical port within the ATM node by using a graphical interface rather than by using a command line interface. At step 52 the NMS receives, through the GUI, an identification of an ATM node and of a physical port within the ATM node. At step 54 the NMS queries the ATM node for a list of current VLAN configurations for VLANs which are currently configured on the ATM node. At step 56 the NMS stores the current VLAN configurations at the NMS as stored VLAN configurations, for example within a database. At step 58 the NMS determines, by counting the number of VLANs for which current VLAN configurations were received from the ATM node, whether addition of a new VLAN would exceed a maximum number of VLANs supportable by the physical port. If a new VLAN would exceed the maximum number of supportable VLANs, the NMS awaits receipt of an identification of another ATM node and physical port combination at step 52.

If configuration of the requested VLAN would not exceed the maximum number of supportable VLANs, then at step 62 the NMS receives a validated configuration for the VLAN. The validated configuration is a list of virtual ports within each of the member set, forbidden set, and untagged set for the VLAN being configured, and a VLAN identification (ID) of the VLAN. The validated configuration is validated in that each virtual port within the Ethernet bridge associated with the VLAN is listed in only one of the member set and the forbidden set of the VLAN, and the VLAN ID is valid. The step 62 of receiving a validated configuration therefore includes a configuration validation aspect, one embodiment of which is described below with respect to FIG. 4.

At step 64 the NMS sends the valid configuration to the ATM node. The ATM node will then update its configuration database to reflect the newly configured VLAN. At step 66 the NMS updates its own database, to include the newly configured VLAN. The NMS then awaits entry of another identification of an ATM node and physical port pair.

Exit and break points have not been included in the flowchart of FIG. 3. The inclusion and location of these within the instructions carried out by the NMS will be obvious to a person skilled in the art.

Figure 4:
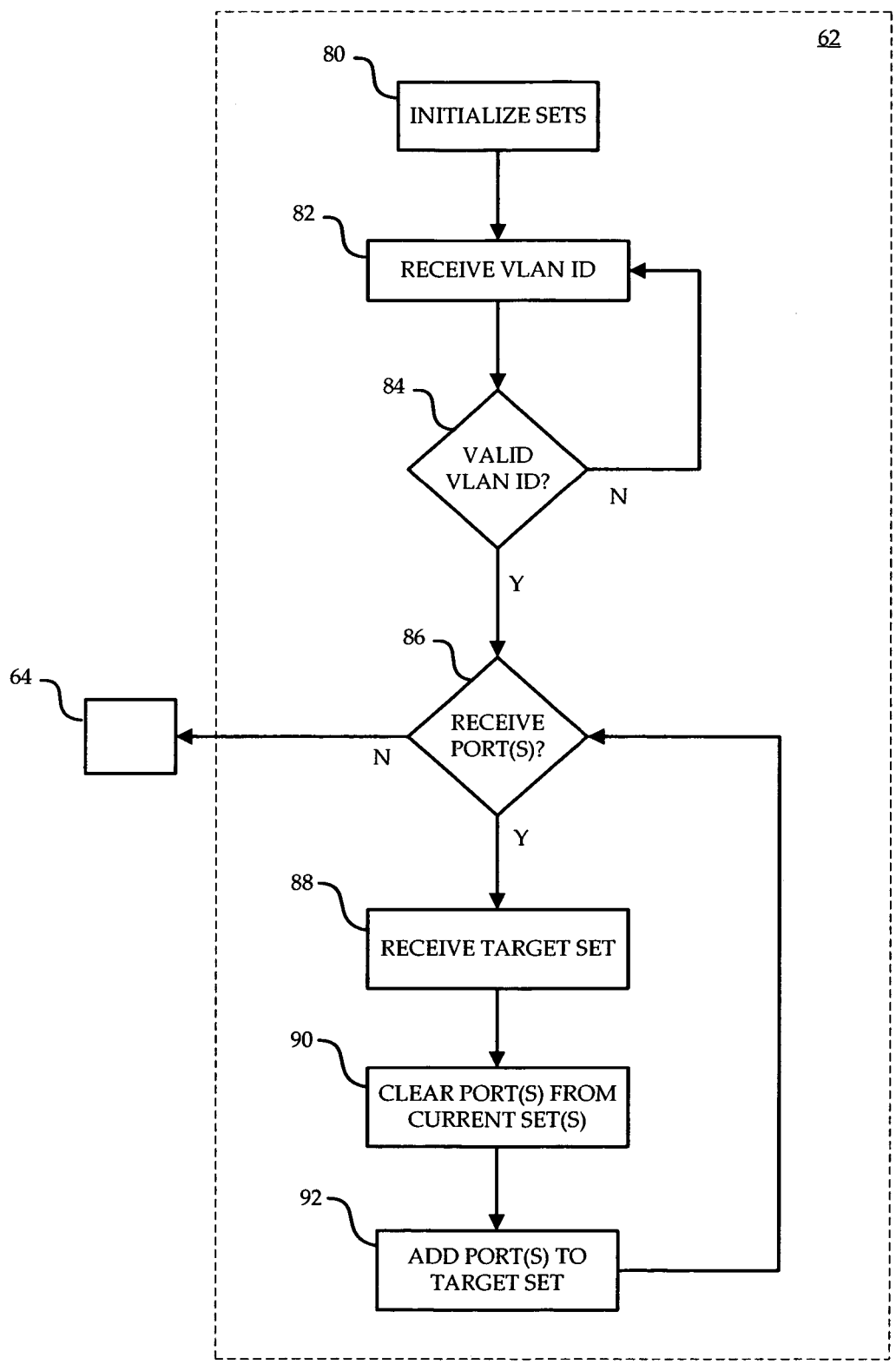
FIG. 4 is a flowchart of an expansion of the step of receiving a validated configuration of FIG. 3 according to one embodiment of the invention.

Referring to FIG. 4, a flowchart of an expansion of the step 62 of FIG. 3 of receipting a validated configuration according to one embodiment of the invention is shown. At step 80, the NMS initializes the member set, forbidden set, and untagged set of the VLAN to be empty, and initializes an available set to include all virtual ports of the Ethernet bridge associated with the physical port. At step 82 the NMS receives a requested VLAN identification (ID), entered by the operator at the GUI. At step 84 the NMS determines whether the requested VLAN ID is a valid. The NMS makes this determination by consulting the stored VLAN configurations. If the requested VLAN ID has already been assigned to a VLAN associated with one of the stored VLAN configurations, then the requested VLAN ID is not valid and the NMS requests a new requested VLAN ID at step 82.

If the requested VLAN ID is valid, then at step 86 the NMS receives an identification of at least one selected virtual port. The identification of at least one selected virtual port is entered by the operator through the GUI. The GUI presents the virtual ports to the operator as lists of virtual ports in each set, that is, a list of virtual ports in the available set, a list of virtual ports in the member set, a list of virtual ports in the forbidden set, and a list of virtual ports in the untagged set. The operator selects the at least one selected virtual port by highlighting one or more virtual ports within one of more of the lists.

At step 88 the NMS receives a target set, entered by the operator through the GUI. The target set will be one of the member set, the forbidden set, the untagged set, and the available set. At step 90 the NMS removes each of the selected virtual ports from the respective set to which each one currently belongs. At step 92 the NMS adds each of the selected virtual ports to the target set. The NMS then awaits receipt of an additional at least one selected virtual port at step 86. If the NMS ever receives no selected virtual port at step 86, such as when the operator has finished identifying the sets to which virtual ports are to be assigned, the NMS sends the configuration to the ATM node at step 64 of FIG. 3.

In this way, each virtual port can belong to at most one of the member set and the forbidden set during configuration. Each virtual port is initially stored in the available set of virtual ports, and can only ever belong to one set. The operator can also see at a glance which virtual ports have been assigned to which sets, and can easily make corrections.

The invention has been described with respect to an ATM network providing the bridging between the Ethernet LANs. Alternatively, other types of networks and nodes can be used.

The invention has been described with respect to configuring a new VLAN. The invention can also be used to reconfigure an existing VLAN. In such an embodiment, the operator selects an option to reconfigure a VLAN and specifies a VLAN ID. The step 80 of FIG. 4 of initializing the sets initializes the member set, forbidden set, and untagged set using the configuration information for the VLAN stored at step 56 of FIG. 3. The steps 82 and 84 of receiving and validating a new VLAN ID are omitted.

The embodiments presented are exemplary only and persons skilled in the art would appreciate that variations to the above described embodiments may be made without departing from the spirit of the invention. Methods which are logically equivalent or similar to the method described above with reference to FIG. 3 and FIG. 4 may be used to implement the methods of the invention. For example, the steps 82 and 84 of FIG. 4 may be combined into a single step of receiving a validated VLAN ID, by allowing the operator to select a VLAN ID only from a list of unused VLAN IDs. The scope of the invention is solely defined by the appended claims.

I claim:

1. A method of providing configuration information for a bridged virtual local area network (VLAN) within a communication network, comprising the steps of:
    presenting a graphical user interface (GUI) to an operator;
    receiving from the operator an identification of a node and of a physical port through the GUI;
    receiving the VLAN configuration information from the operator through the GUI, wherein the VLAN configuration information comprises a requested VLAN identifier (ID), a first set of at least one virtual port to be associated with a member set of the VLAN, and a second set of one or more virtual ports to be associated with a forbidden set of the VLAN;
    validating the VLAN configuration information, comprising:
        ensuring that the first set and the second set have no virtual ports in common, and
        ensuring that configuring the VLAN associated with the requested VLAN ID would not violate a maximum limit of VLANS on the physical port;
    generating locally a validated VLAN configuration according to the VLAN configuration information, wherein the validated VLAN configuration comprises the first set of at least one virtual port and the second set of one or more virtual ports; and
    transmitting the validated VLAN configuration to the node.

2. The method of claim 1 wherein the first set of at least one virtual port is selected by the operator from a list of virtual ports currently in an available set.

3. The method of claim 2 wherein the step of receiving VLAN configuration information further comprises the steps of:
    receiving, from the operator through the GUI, an identification of one or more virtual ports to be associated with an untagged set of the VLAN.

4. The method of claim 1 further comprising storing the validated configuration information at a network management system.

5. The method of claim 1 wherein the node is an Asynchronous Transfer Mode node.

6. The method of claim 1 wherein the bridged VLAN is in conformance with the 802.1q VLAN standard.

7. The method of claim 1 comprising the further steps of querying the node for a list of VLAN configurations which are currently configured on the node and storing the list.

8. The method of claim 1 wherein validating the VLAN configuration information comprises, if the VLAN is a new VLAN, validating the requested VLAN ID by comparing the requested VLAN ID with VLAN IDs in a list of VLAN configurations for VLANs that are configured on the node.

9. The method of claim 1 wherein generating the validated VLAN configuration further comprises:
    removing at least one port identified by the operator through the GUI from a list to which the at least one port currently belongs; and
    adding the at least one port to a list identified by the operator through the GUI.

10. A system including at least one device presenting a graphical user interface (GUI) to an operator, the at least one device comprising:
    a processor for providing configuration information for a bridged virtual local area network (VLAN) within a communication network;
    the processor is configured to perform steps comprising:
    presenting said graphical user interface (GUI) to the operator;
    receiving an identification of a node and of a physical port through the GUI;
    receiving VLAN configuration information from the operator through the GUI, wherein the VLAN configuration information comprises a requested VLAN identifier (ID), a first set of at least one virtual port to be associated with a member set of the VLAN, and a second set of one or more virtual ports to be associated with a forbidden set of the VLAN;
    validating the VLAN configuration information, the validating comprising ensuring that the first set and the second set have no virtual ports in common;
    generating locally a validated VLAN configuration according to the VLAN configuration information, wherein the validated VLAN configuration comprises the first set of at least one virtual port and the second set of one or more virtual ports; and
    transmitting the validated VLAN configuration to the node.

11. The system of claim 9 wherein the first set of at least one virtual port is selected by the operator from a list of virtual ports currently in an available set.

12. The system of claim 10 wherein receiving the VLAN configuration information further comprise:
    receiving, from the operator through the GUI, an identification of one or more virtual ports to be associated with an untagged set of the VLAN.

13. The system of claim 10 further comprising storing the validated configuration information at a network management system.

14. The system of claim 10 wherein the node is an Asynchronous Transfer Mode node.

15. The system of claim 10 wherein the bridged VLAN is in conformance with the 802.1q VLAN standard.

16. The system of claim 10 further comprising querying the node for a list of VLAN configurations which are currently configured on the node and storing the list.

17. The system of claim 10 wherein validating the VLAN configuration information further comprises instructions for, if the VLAN is a new VLAN, validating the requested VLAN ID by comparing the requested VLAN ID with VLAN IDs in a list of VLAN configurations for VLANs that are configured on the node.

18. The system of claim 10 wherein generating the validated VLAN configuration comprising:
    removing at least one port identified by the operator through the GUI from a list to which the at least one port currently belongs; and
    adding the at least one port to a list identified by the operator through the GUI.

* * * * *